United States Patent
Tang et al.

(10) Patent No.: US 10,738,864 B2
(45) Date of Patent: Aug. 11, 2020

(54) LINEAR DRIVE APPARATUS

(71) Applicant: CONTINENTAL AUTOMOTIVE GmbH, Hannover (DE)

(72) Inventors: Runqiu Tang, Wuhu-Jinghu (CN);
Xiaolin Du, Wuhu-Jiujiang (CN);
Xiangguang Cao, Wuhu-Jiujiang (CN);
Chunyan Tang, Wuhu-Jiujiang (CN);
Qiang Li, Wuhu-Jinghu (CN)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 16/086,722

(22) PCT Filed: Mar. 21, 2017

(86) PCT No.: PCT/EP2017/056694
§ 371 (c)(1),
(2) Date: Sep. 20, 2018

(87) PCT Pub. No.: WO2017/162672
PCT Pub. Date: Sep. 28, 2017

(65) Prior Publication Data
US 2019/0063566 A1 Feb. 28, 2019

(30) Foreign Application Priority Data
Mar. 22, 2016 (CN) .................... 2016 2 0221955 U

(51) Int. Cl.
*F16K 31/53* (2006.01)
*F16H 25/18* (2006.01)
(Continued)

(52) U.S. Cl.
CPC ........... *F16H 25/186* (2013.01); *F02M 26/48* (2016.02); *F02M 26/54* (2016.02); *F02M 26/67* (2016.02);
(Continued)

(58) Field of Classification Search
CPC .. F16K 31/042; F16K 31/52408; F16K 31/53; F16K 31/047; F02M 26/54; F02M 26/67; F16H 37/124; F16H 25/186
(Continued)

(56) References Cited

U.S. PATENT DOCUMENTS

| | | | |
|---|---|---|---|
| 10,180,181 B2* | 1/2019 | Cao | F16H 61/32 |
| 2013/0269664 A1* | 10/2013 | Park | F16K 31/528 |
| | | | 123/568.29 |

(Continued)

FOREIGN PATENT DOCUMENTS

| | | |
|---|---|---|
| EP | 2 650 524 | 10/2013 |
| EP | 2 884 086 | 6/2015 |

(Continued)

OTHER PUBLICATIONS

Office Action dated Jan. 27, 2020 issued in India Patent Application No. 201837025226.

*Primary Examiner* — Randell J Krug
(74) *Attorney, Agent, or Firm* — Cozen O'Connor

(57) ABSTRACT

A linear drive apparatus including: a housing. Located inside the housing are an electric motor, a transmission gear, which meshes with an output gear on an output shaft of the electric motor, a gear shaft, and a linear motion assembly. The transmission gear is mounted on the gear shaft, the linear motion assembly is mounted to cooperate with the transmission gear, and converts rotational motion of the transmission gear to linear motion. An axis of the linear motion assembly is arranged in the same plane as an axis of the electric motor output shaft and an axis of the gear shaft. The linear drive apparatus has the advantages of a compact structure, small volume, light weight, and good heat dissipation.

16 Claims, 6 Drawing Sheets

(51) Int. Cl.
    *F02M 26/48*     (2016.01)
    *F02M 26/54*     (2016.01)
    *F02M 26/67*     (2016.01)
    *F16K 31/524*     (2006.01)
    *F16K 31/528*     (2006.01)

(52) U.S. Cl.
    CPC ........ *F16K 31/528* (2013.01); *F16K 31/5245* (2013.01)

(58) Field of Classification Search
    USPC .................. 123/568.26, 568.29; 251/129.11
    See application file for complete search history.

(56) References Cited

U.S. PATENT DOCUMENTS

2014/0034029 A1     2/2014    Sasaki et al.
2017/0204815 A1*   7/2017    Park ...................... F02M 26/67

FOREIGN PATENT DOCUMENTS

KR        2010 0042779      4/2010
WO     WO 2015/036329    3/2015

* cited by examiner

LINEAR DRIVE APPARATUS

CROSS REFERENCE TO RELATED APPLICATIONS

This is a U.S. national stage of application No. PCT/EP2017/056694, filed on Mar. 21, 2017. Priority is claimed on Chinese Application No. CN201620221955.4, filed Mar. 22, 2016, the content of which is incorporated here by reference.

BACKGROUND OF THE INVENTION

1. Field of the Invention

The present device relates to a motor vehicle component product, in particular to a linear drive apparatus for use in a motor vehicle driving force assembly.

2. Description of the Prior Art

In the motor vehicle industry, to increase the air intake efficiency and reduce the emission of pollutants, it is often necessary to use a valve apparatus capable of precisely controlling intake and exhaust in the driving force assembly system, e.g. an apparatus such as an exhaust gas recirculation control valve used in an engine's exhaust gas recirculation system. The majority of such valve apparatuses are linear drive apparatuses, which use an electric motor as a source of driving force, and then convert a rotational output of the electric motor to linear motion of a linear motion assembly (e.g. a valve rod).

In linear drive apparatuses currently on the market, the electric motor, transmission gears and valve rod are in most cases arranged in both transverse and longitudinal directions, and the transmission gears are not of a weight-saving design; the result is that the overall volume and weight of the linear drive apparatus is relatively large.

SUMMARY OF THE INVENTION

An object of the present device is to provide a linear drive apparatus, which solves the problems affecting existing linear drive apparatuses, namely that their structure is not compact, have a large volume, a heavy weight, and poor heat dissipation. The linear drive apparatus provided by the present device comprises: a housing and, located inside the housing: an electric motor; a transmission gear meshed with an output gear on an output shaft of the electric motor, the transmission gear being mounted on a gear shaft located inside the housing; and a linear motion assembly, which is fitted to the transmission gear and converts rotational motion of the transmission gear to linear motion; wherein an axis of the linear motion assembly is arranged in the same plane as an axis of the electric motor output shaft and an axis of the gear shaft. Furthermore, the transmission gear is a cam gear.

According to one aspect of the invention, the cam gear comprises a cam gear part and a cam groove part; the cam gear part meshes with the output gear of the electric motor.

According to one aspect of the invention, the cam gear part has a weight-saving hole.

According to one aspect of the invention, the cam groove part has a groove inner wall close to a central axis of the cam gear and a groove outer wall remote from the central axis of the cam gear.

According to one aspect of the invention, one end of the cam groove part is an open groove, while the other end is a closed groove. Furthermore, the linear motion assembly comprises an adjusting rod, a connecting rod structure, a bearing, a magnet assembly and a sensor; the connecting rod structure is mounted on the adjusting rod; the bearing, the magnet assembly and the sensor are all mounted on the connecting rod structure; and the bearing is located in the cam groove part, so as to convert rotational motion of the cam gear to linear motion of the linear motion assembly. Furthermore, an axis of the adjusting rod is arranged in the same plane as the axis of the electric motor output shaft and the axis of the gear shaft. Furthermore, an axis of the bearing is arranged in the same plane as the axis of the adjusting rod, the axis of the electric motor output shaft, and the axis of the gear shaft.

According to one aspect of the invention, the axis of the bearing is arranged in the same plane as the axis of the linear motion assembly, the axis of the electric motor output shaft, and the axis of the gear shaft.

According to one aspect of the invention, the sensor is a non-contact sensor. Furthermore, the linear drive apparatus also comprises a cooling water path, which surrounds the linear motion assembly.

According to one aspect of the invention, the cooling water path is located in the housing. Furthermore, the linear drive apparatus also comprises a limiting pin disposed inside the housing; the transmission gear will abut the limiting pin upon rotation to a certain angle, thereby realizing mechanical stoppage. Furthermore, the linear drive apparatus also comprises: a return spring mounted on the gear shaft, the return spring being used for return of the transmission gear; an end cover fitted to the housing, and an adjusting head fixed to one end of the linear motion assembly.

Compared with the prior art, the linear drive apparatus provided by the present device has the advantages of a compact structure, small volume, light weight, and good heat dissipation. Description of the accompanying drawings The accompanying drawings, which form part of this application, are intended to furnish further understanding of the present device.

BRIEF DESCRIPTION OF THE DRAWINGS

The schematic embodiments of the present device and the explanations thereof are intended to explain the present device, but do not constitute an inappropriate limitation thereof. In the drawings.

PARTICULAR EMBODIMENTS

Figure 1:
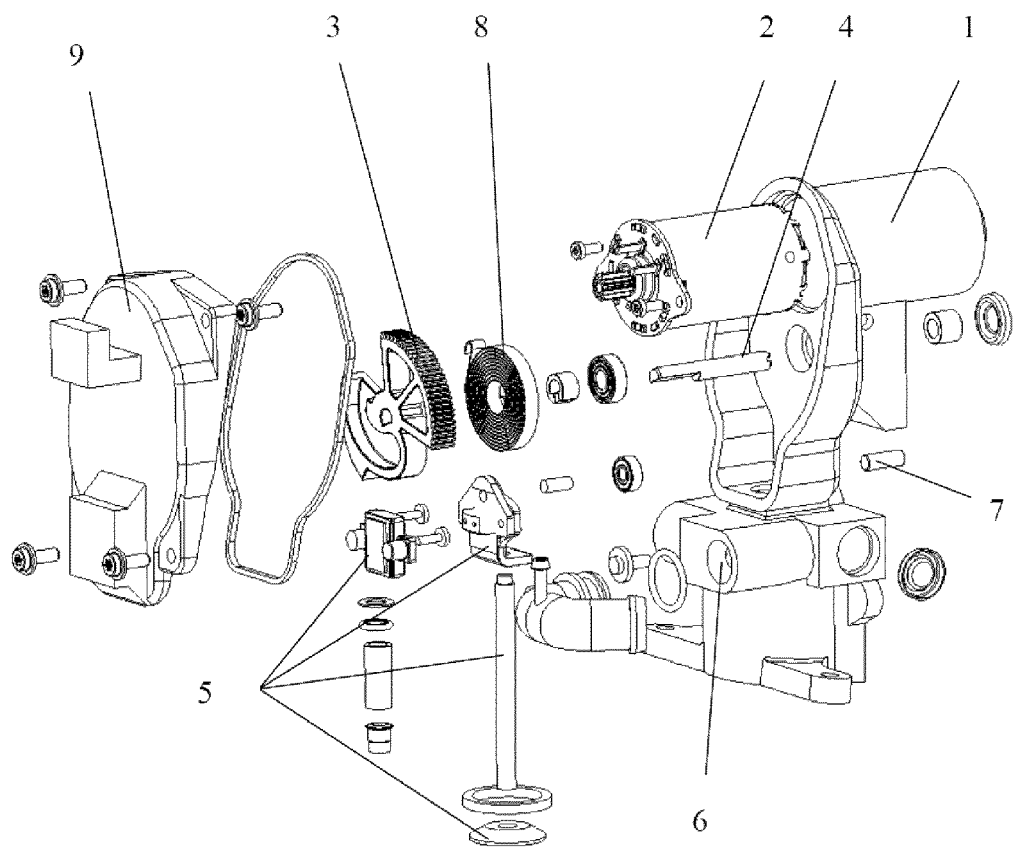
FIG. 1 is an exploded schematic view of the linear drive apparatus of the present device.
Figure 2:
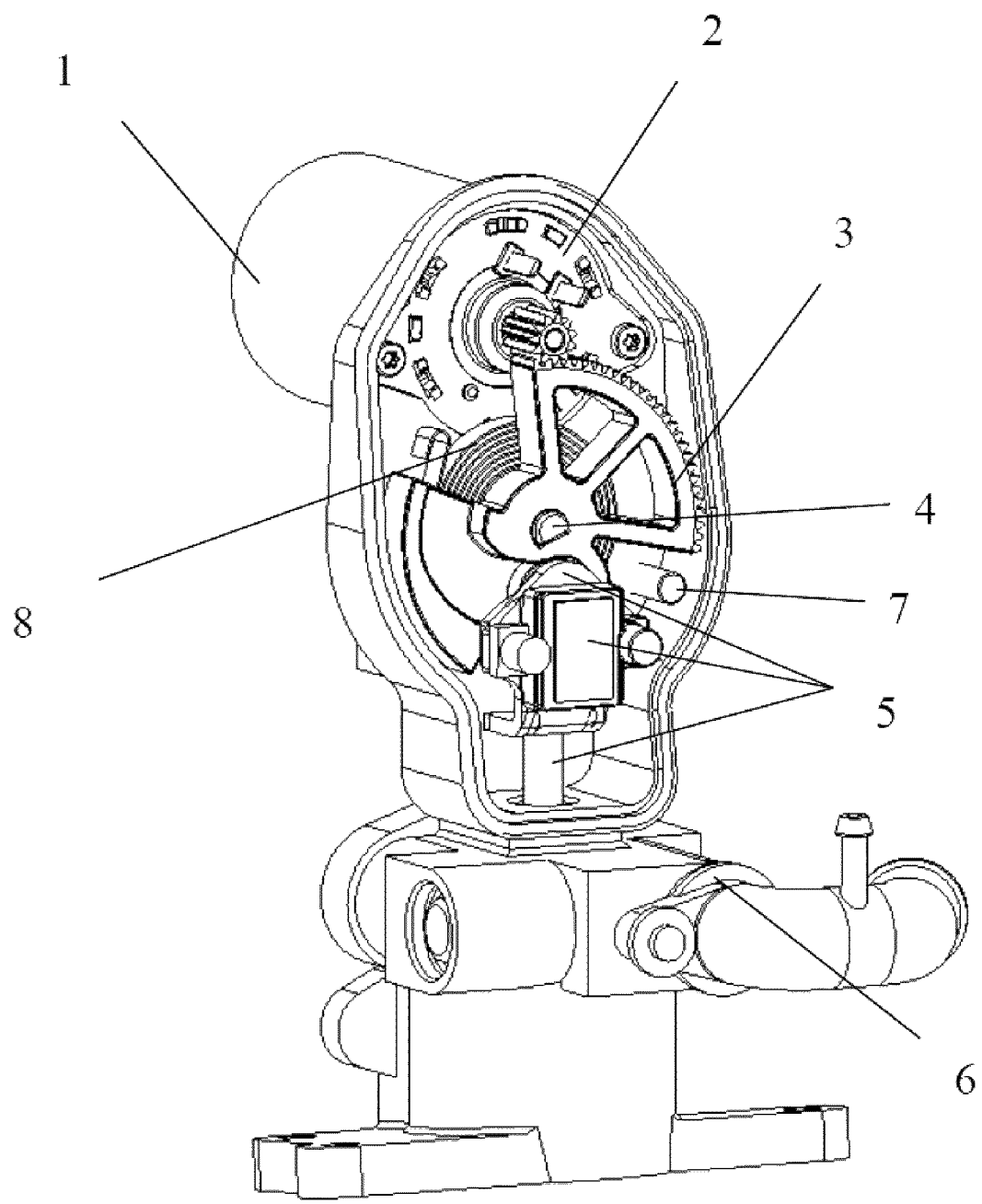
FIG. 2 is a three-dimensional perspective drawing of the linear drive apparatus shown in FIG. 1 after assembly (excluding the end cover)

The linear drive apparatus of the present device is described below by with reference to the accompanying drawings. FIG. 1 is an exploded schematic view of the linear drive apparatus of the present device. FIG. 2 is a three-dimensional perspective drawing of the linear drive apparatus shown in FIG. 1 after assembly (excluding the end cover). As shown in FIGS. 1 and 2, the linear drive apparatus comprises the following structure: a housing 1; and, located inside the housing 1: an electric motor 2, a transmission gear 3, which meshes with an output gear on an output shaft of the electric motor 2, and a gear shaft 4 and a linear motion assembly 5; the transmission gear 3 is mounted on the gear shaft 4, the linear motion assembly 5 is mounted to cooperate with the transmission gear 3, and converts rotational motion of the transmission gear 3 to linear motion to reduce the overall width of the linear drive apparatus, be conducive to the center of gravity layout and increase the conversion efficiency of linear motion. The following special design is implemented in this embodiment: the axis of the linear motion assembly 5 is arranged in the same plane as the axis of the output shaft of the electric motor 2 and the axis of the gear shaft 4.

Figure 6:
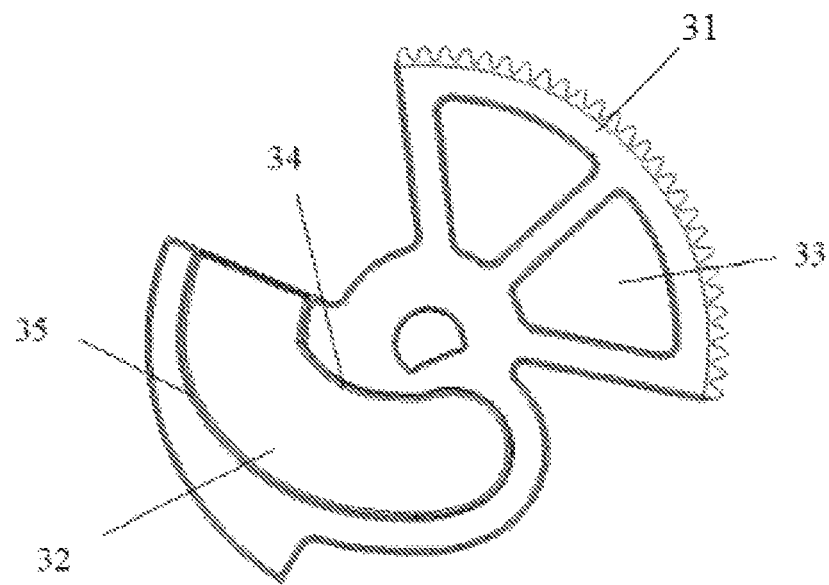
FIG. 6 is an enlarged schematic view of the transmission gear.

Preferably, to better realize transmission and reduce the weight of the linear drive apparatus, the transmission gear 3 may be designed as a cam gear, specifically as shown in FIG. 6. The cam gear comprises a cam gear part 31 and a cam groove part 32; the cam gear part 31 meshes with the output gear of the electric motor to realize rotational motion and perform torque transfer, and the cam gear part 31 also has one or more holes 33; in this embodiment, there are two weight-saving holes. The cam groove part 32 also has a groove inner wall 34 proximate to a central axis of the cam gear and a groove outer wall 35 remote from the central axis of the cam gear. Moreover, one end of the cam groove part 32 is an open groove, while the other end is a closed groove.

Preferably, as shown in FIGS. 1 to 5, in order to cooperate with the transmission gear 3 (cam gear 3) described above and convert rotational motion of the gear to linear motion, the linear drive apparatus in this embodiment also comprises an adjusting rod 51, a connecting rod structure 52, a bearing 53, a magnet assembly 54, and a sensor 55. The connecting rod structure 52 is mounted on the adjusting rod 51, the bearing 53, the magnet assembly 54 and the sensor 55 are all mounted on the connecting rod structure 52, and the bearing 53 is located in a groove of the cam groove part 32, so as to convert rotational motion of the cam gear 3 to linear motion of the linear motion assembly 5. Specifically, when the cam gear 3 moves in one of the directions (e.g. when the linear drive apparatus executes a valve opening motion), the linear motion assembly 5 is in contact with the groove inner wall 34, and moves downward under the action of the groove inner wall 34; conversely, when the cam gear 3 moves in the opposite direction (e.g. when the linear drive apparatus executes a valve closing motion), the linear motion assembly 5 is in contact with the groove outer wall 35, and moves upward under the action of the groove outer wall 35. Preferably, a cam curve of the cam groove part 32 is divided into three sections: a lead-in section, a motion section, and a lifting section (not marked with numerical labels in the figures). The lead-in section is the open groove mentioned previously, the design objective thereof being to enable the bearing 53 to slide smoothly into the cam groove part 32. Such an open cam groove design facilitates assembly of components, and enables the linear motion assembly to slide in through an opening.

Preferably, the axis of the adjusting rod 51 is arranged in the same plane as the axis of the output shaft of the electric motor 2 and the axis of the gear shaft 4. More preferably, the axis of the bearing 53 is arranged in the same plane as the axis of the adjusting rod 51, the axis of the output shaft of the electric motor 2, and the axis of the gear shaft 4, as the longitudinal arrangement shown by the figure direction, or the axis of the bearing 53 is arranged in the same plane as the axis of the linear motion assembly 5, the axis of the output shaft of the electric motor 2, and the axis of the gear shaft 4. Such a design has the following advantages:

1) three or four components sharing a common plane can effectively reduce the transverse dimension of the linear motion apparatus (valve body), to meet special requirements of a customer regarding dimension;

2) four components sharing a common plane facilitates arrangement of the center of gravity of the linear motion apparatus, thereby increasing the performance stability thereof under vibrating conditions; and 3) with the central axes of the gear shaft 4, bearing 53 and linear motion assembly 5 sharing a common plane, the efficiency of conversion of rotational motion to linear motion can also be increased effectively.

Figure 7:
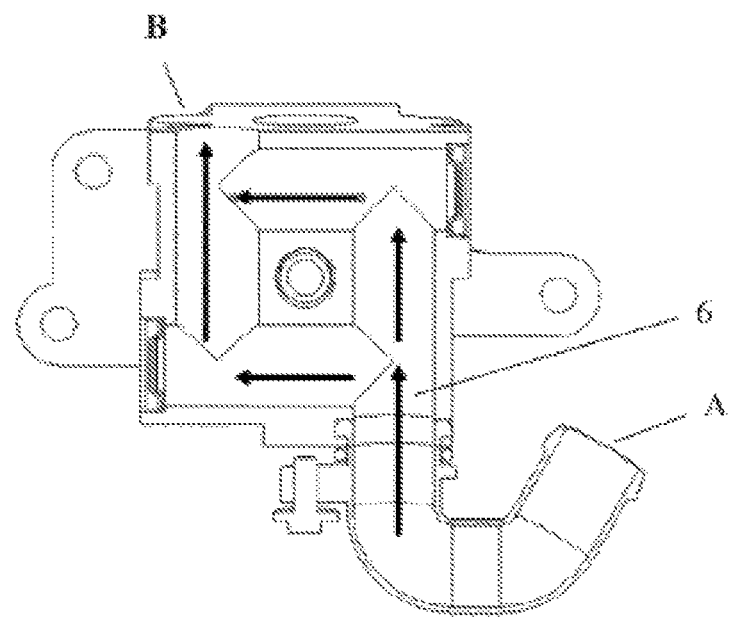
FIG. 7 is a schematic drawing of the arrangement of the cooling water path.

Preferably, the sensor 55 is a non-contact sensor, e.g. may be a magnetoresistive sensor, an inductive sensor or a Hall sensor, and has the following operating principles: when a drive transmission system drives a change in position of the linear motion assembly 5, the position of an inductive element (such as a magnet assembly 54, inductive pointer, etc.) connected to the linear motion assembly 5 also changes accordingly; at this time, the sensor 55 can sense a change in the magnetic field of the inductive element, and convert this into a change in a voltage signal, which is outputted to an engine control unit or an electronic control unit; then, by comparing differences between an actual voltage signal and a target voltage signal, the engine control unit or electronic control unit continuously adjusts an instruction until the linear drive apparatus reaches a target position. Preferably, as shown in FIGS. 1 to 4 and FIG. 7, the linear drive apparatus also comprises a cooling water path 6, which surrounds the linear motion assembly 5. Specifically, the water path described in this embodiment is an integral water path located in the housing 1, as shown in FIG. 7; the letter A indicates a water inlet, the letter B indicates a water outlet, and the black arrows mark the water flow directions. The arrangement of the cooling system has the following characteristics: 1) the water path is arranged between exhaust gas and the transmission system, so can effective reduce the amount of heat transferred from exhaust gas to the transmission system part, and in turn reduce the effect of exhaust gas temperature on the performance and lifespan of the linear drive apparatus, 2) the water path is arranged all around the linear motion assembly 5, so on the one hand the volume of the linear drive apparatus can be reduced, and on the other hand the area of contact with exhaust gas can be increased so as to ensure the cooling effect.

Figure 3:
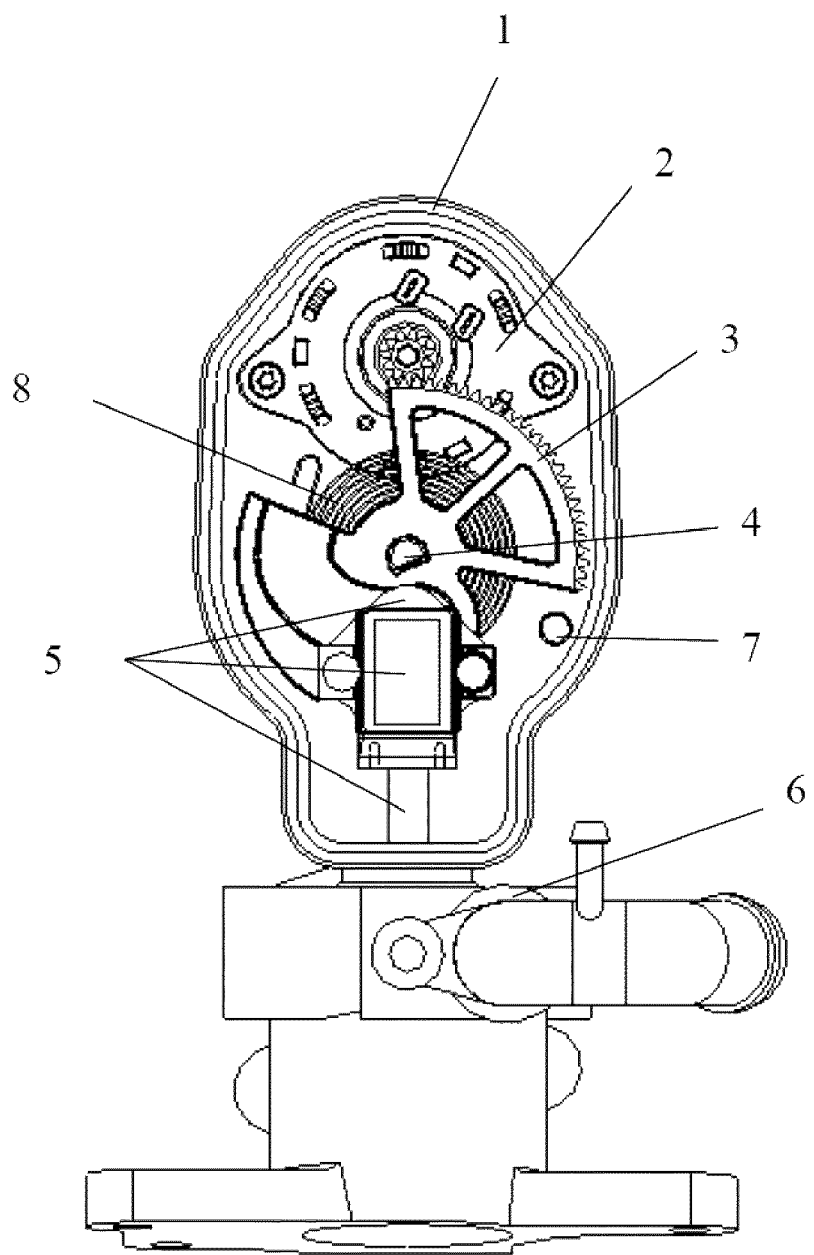
FIG. 3 is a perspective front view of the linear drive apparatus shown in FIG. 2 (excluding the end cover)
Figure 4:
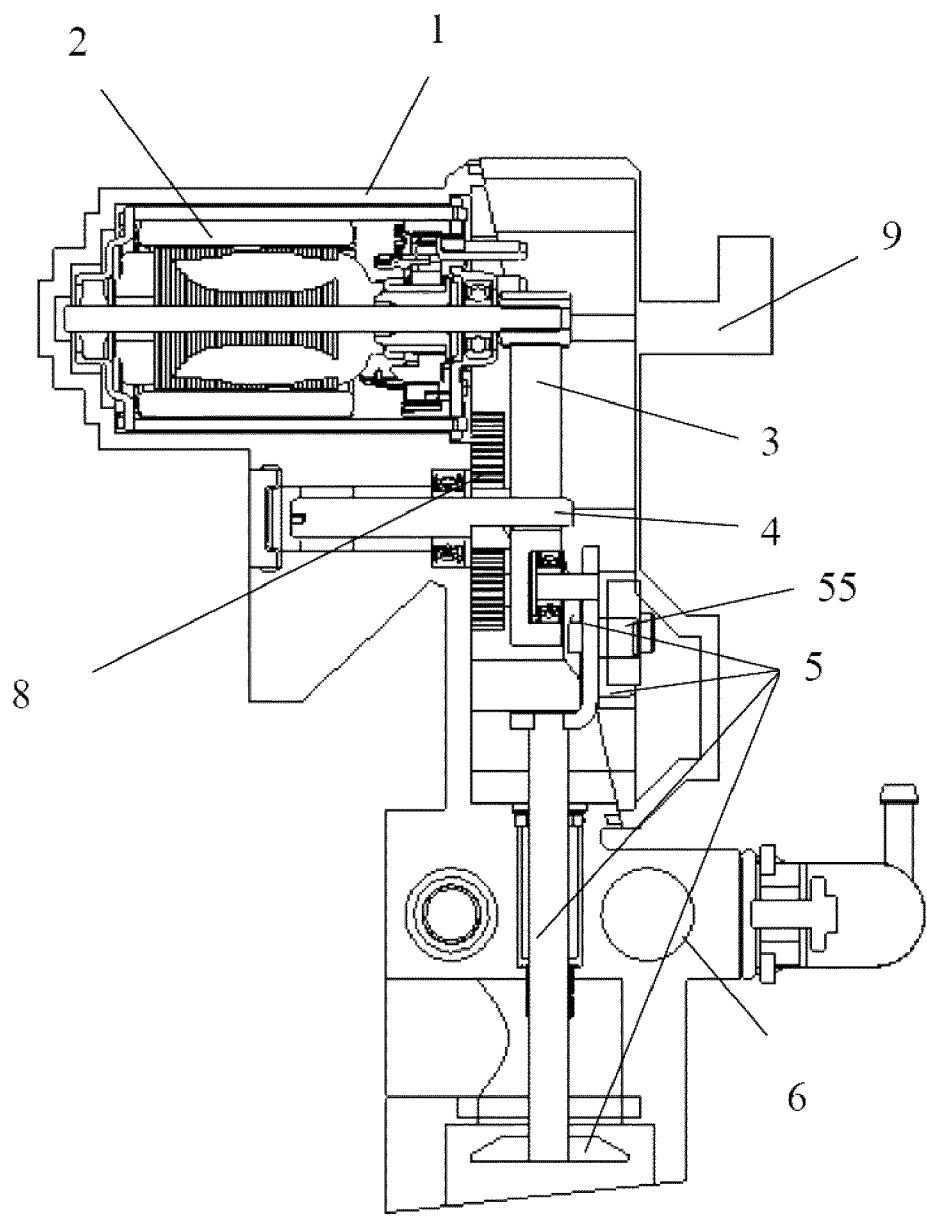
FIG. 4 is a sectional left view of the linear drive apparatus shown in FIG. 3 (including the end cover)
Figure 5:
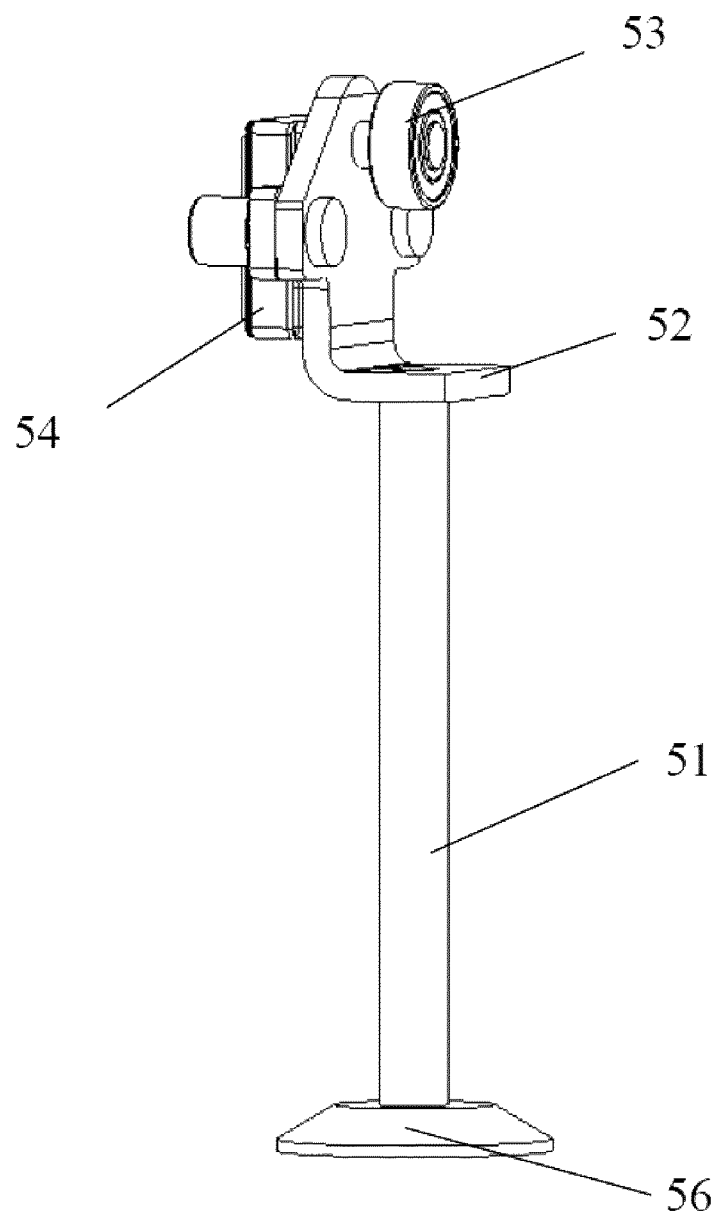
FIG. 5 is a three-dimensional schematic view of the linear motion assembly.

Preferably, as shown in FIGS. 1 to 3, the linear drive apparatus also comprises a limiting pin 7 disposed in the housing 1. The transmission gear 3 comes into striking contact with the limiting pin 7 upon rotation to a certain angle, thereby realizing mechanical stoppage of motion through a stroke.

Preferably, as shown in FIGS. 1 to 5, the linear drive apparatus also comprises a return spring 8 mounted on the gear shaft, the return spring 8 being used for return of the transmission gear 3, an end cover 9 fitted to the housing 1, and an adjusting head 56 fixed to one end of the linear motion assembly 5. When mounted (with the linear drive apparatus in a closed state), the return spring 8 is in a preloaded state, so that it can be ensured that in case of a power cut, the linear drive apparatus can return to an initial position (closed state), and when the linear drive apparatus is in an operational state, the return spring 8 will be further preloaded, thereby ensuring that it has a sufficient return force in case of no power. In summary, the operating modes of the linear drive apparatus in this embodiment are roughly as follows:

1) When the linear drive apparatus is energized, the output gear of the electric motor 2 rotates clockwise, driving the cam gear 3 (transmission gear 3) to rotate anticlockwise. The rotation of the cam groove part 32 of the cam gear 3 drives the bearing 53 to move downwards along the cam groove part 32, in turn pushing the linear motion assembly 5 to move downwards. In this way, a valve of the linear drive apparatus is opened, and exhaust gas enters through a valve opening.

2) When the supply of power to the linear drive apparatus is cut, since the return spring 8 is preloaded at the time of mounting, the preload of the return spring 8 is transferred to the gear shaft 4 through a spring bush, the gear shaft 4 rotates clockwise, driving the cam gear 3 to rotate clockwise, and under the action of the cam groove outer wall 35 the bearing 53 is driven to move upwards along the cam groove part 32, in turn pulling the linear motion assembly 5 to move upwards until the valve closes.

During the process of opening and closing of the valve mentioned above, the position of the magnet assembly 54 mounted on the linear motion assembly 5 is an input signal of the sensor 55; after receiving the signal, the sensor 55 learns the extent to which the valve is opened, and transmits this to the engine control unit; the engine control unit then controls the on/off switching of a power supply, thereby realizing control of opening/closing of the valve.

Although the present device has been disclosed above by means of preferred embodiments, it is by no means limited to this. Various changes and amendments made by any person skilled in the art within the spirit and scope of the present device shall be included in the scope of protection thereof. Thus, the scope of protection of the present device should be regarded as the scope defined by the claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A linear drive apparatus, comprising:
   a housing;
   an electric motor located inside the housing;
   a transmission gear having a first arcuate portion configured to directly mesh with an output gear on an output shaft of the electric motor, the transmission gear being mounted on a gear shaft located inside the housing; and
   a linear motion assembly, which is fitted to a second arcuate portion of the transmission gear and is configured to convert rotational motion of the transmission gear to linear motion;
   wherein the first arcuate portion of the transmission gear is separate from the second arcuate portion of the transmission gear,
   wherein the first arcuate portion of the transmission gear is arranged circumferentially opposite the second arcuate portion of the transmission gear,
   wherein the first arcuate portion of the transmission gear and the second arcuate portion of the transmission gear define two free spaces arranged between the first arcuate portion of the transmission gear and the second arcuate portion of the transmission gear, and
   wherein an axis of the linear motion assembly is arranged in a same plane as an axis of the output shaft of the electric motor and an axis of the gear shaft.

2. The linear drive apparatus as claimed in claim 1, wherein the transmission gear is a cam gear.

3. The linear drive apparatus as claimed in claim 2, wherein the cam gear comprises a cam gear part and a cam groove part; and
   wherein, the cam gear part meshes with the output gear of the electric motor.

4. The linear drive apparatus as claimed in claim 3, wherein the cam gear part has a weight-saving hole.

5. The linear drive apparatus as claimed in claim 3, wherein the cam groove part has a groove inner wall proximate to a central axis of the cam gear and a groove outer wall, wherein the groove inner wall is closer to a central axis of the cam gear than the groove outer wall.

6. The linear drive apparatus as claimed in claim 3, wherein one end of the cam groove part is an open groove and an other end of the cam groove part is a closed groove.

7. The linear drive apparatus as claimed in claim 3, wherein the linear motion assembly comprises:
   an adjusting rod;
   a connecting rod structure mounted on the adjusting rod;
   a bearing mounted on the adjusting rod and located in the cam groove part, so as to convert rotational motion of the cam gear to linear motion of the linear motion assembly;
   a magnet assembly mounted on the adjusting rod;
   and a sensor mounted on the adjusting rod.

8. The linear drive apparatus as claimed in claim 7, wherein an axis of the adjusting rod is arranged in a same plane as the axis of the output shaft of the electric motor and an axis of the gear shaft.

9. The linear drive apparatus as claimed in claim 8, wherein an axis of the bearing is arranged in the same plane as the axis of the adjusting rod, the axis of the output shaft of the electric motor, and the axis of the gear shaft.

10. The linear drive apparatus as claimed in claim 7, wherein an axis of the bearing is arranged in a same plane as an axis of the linear motion assembly, an axis of the output shaft of the electric motor, and an axis of the gear shaft.

11. The linear drive apparatus as claimed in claim 7, wherein the sensor is a non-contact sensor.

12. The linear drive apparatus as claimed in claim 1, wherein the linear drive apparatus further comprises a cooling water path that surrounds the linear motion assembly.

13. The linear drive apparatus as claimed in claim 12, wherein the cooling water path is located in the housing.

14. The linear drive apparatus as claimed in claim 1,
wherein the linear drive apparatus further comprises a limiting pin disposed inside the housing;
wherein the transmission gear is configured to abut the limiting pin upon rotation to a certain angle, thereby realizing a mechanical stoppage.

15. The linear drive apparatus as claimed in claim 1, wherein the linear drive apparatus further comprises:
a return spring mounted on the gear shaft and configured to return the transmission gear;
an end cover fitted to the housing; and
an adjusting head fixed to one end of the linear motion assembly.

16. The linear drive apparatus as claimed in claim 1, wherein the transmission gear, the output gear on the output shaft of the electric motor, and the linear motion assembly are arranged in a second plane perpendicular to the same plane.

\* \* \* \* \*